United States Patent
Mangalvedhekar

(10) Patent No.: US 7,536,404 B2
(45) Date of Patent: May 19, 2009

(54) ELECTRONIC FILES PREPARATION FOR STORAGE IN A SERVER

(75) Inventor: Sunit B. Mangalvedhekar, Pune (IN)

(73) Assignee: Siemens Product Lifecycle Management Software, Inc., Plano, TX (US)

( * ) Notice: Subject to any disclaimer, the term of this patent is extended or adjusted under 35 U.S.C. 154(b) by 451 days.

(21) Appl. No.: 10/085,217

(22) Filed: Feb. 27, 2002

(65) Prior Publication Data

US 2003/0115171 A1 Jun. 19, 2003

Related U.S. Application Data

(60) Provisional application No. 60/340,411, filed on Dec. 13, 2001.

(51) Int. Cl.
*G06F 17/30* (2006.01)

(52) U.S. Cl. .................................................. 707/102

(58) Field of Classification Search ............. 707/2, 707/3, 4, 5, 9, 10, 102, 100, 101, 103 R, 104.1, 707/202, 218, 1, 200, 205; 709/206, 203, 709/222; 358/1.15; 715/523, 524, 500.1, 715/513, 533; 712/224; 345/428; 370/468
See application file for complete search history.

(56) References Cited

U.S. PATENT DOCUMENTS

| | | | | |
|---|---|---|---|---|
| 4,805,134 A * | 2/1989 | Calo et al. ..................... 707/10 |
| 4,939,689 A * | 7/1990 | Davis et al. ................. 707/102 |
| 5,282,207 A * | 1/1994 | Jurkevich et al. ........... 370/468 |
| 5,291,602 A * | 3/1994 | Barker et al. ................. 715/524 |
| 5,299,304 A * | 3/1994 | Williams et al. ............. 715/523 |
| 5,341,478 A * | 8/1994 | Travis et al. ................. 709/203 |
| 5,345,550 A * | 9/1994 | Bloomfield .................. 345/841 |
| 5,388,196 A * | 2/1995 | Pajak et al. .................. 345/751 |
| 5,444,850 A * | 8/1995 | Chang ......................... 709/222 |
| 5,469,540 A * | 11/1995 | Powers et al. ............. 715/500.1 |
| 5,530,852 A * | 6/1996 | Meske et al. ................. 709/206 |
| 5,721,906 A * | 2/1998 | Siefert ............................ 707/9 |
| 5,764,235 A * | 6/1998 | Hunt et al. ................... 345/428 |
| 5,768,483 A * | 6/1998 | Maniwa et al. .............. 358/1.15 |
| 5,835,724 A | 11/1998 | Smith .......................... 709/227 |
| 5,870,552 A | 2/1999 | Dozier et al. ................ 709/219 |
| 5,903,723 A | 5/1999 | Beck et al. ................... 709/200 |
| 5,978,841 A | 11/1999 | Berger ......................... 709/217 |
| 5,978,847 A | 11/1999 | Kisor et al. .................. 709/227 |
| 6,009,410 A | 12/1999 | LeMole et al. ................. 705/14 |
| 6,012,090 A | 1/2000 | Chung et al. ................. 709/219 |

(Continued)

FOREIGN PATENT DOCUMENTS

WO  WO 98/20434       5/1998
WO  WO 01/35056 A1   5/2001

OTHER PUBLICATIONS

CIMdata, Inc., "Program Review of Eigner + Partner's axalant cPDm Program," Online, pp. 1-31, Sep. 2000.

(Continued)

*Primary Examiner*—Shahid A Alam

(57) ABSTRACT

According to one embodiment of the invention, a method for preparing files for storage in a server includes generating a profile for a selected file. The profile identifies at least one associated file as associated with the selected file. The method also includes transmitting, to a server, the selected file, the profile, and the at least one associated file.

25 Claims, 3 Drawing Sheets

U.S. PATENT DOCUMENTS

| | | | |
|---|---|---|---|
| 6,029,141 A | 2/2000 | Bezos et al. | 705/27 |
| 6,035,330 A * | 3/2000 | Astiz et al. | 709/218 |
| 6,052,730 A | 4/2000 | Felciano et al. | 709/225 |
| 6,061,783 A * | 5/2000 | Harriman | 712/224 |
| 6,119,153 A | 9/2000 | Dujari et al. | 709/218 |
| 6,125,352 A | 9/2000 | Franklin et al. | 705/26 |
| 6,141,333 A | 10/2000 | Chavez, Jr. | 370/338 |
| 6,173,318 B1 | 1/2001 | Jackson et al. | 709/219 |
| 6,253,204 B1 * | 6/2001 | Glass et al. | 707/102 |
| 6,321,258 B1 | 11/2001 | Stollfus et al. | 709/220 |
| 6,408,296 B1 | 6/2002 | Acharya et al. | 707/10 |
| 6,466,940 B1 | 10/2002 | Mills | 707/102 |
| 6,484,149 B1 | 11/2002 | James et al. | 705/26 |
| 6,505,237 B2 | 1/2003 | Beyda et al. | 709/206 |
| 6,510,467 B1 | 1/2003 | Behfar et al. | 709/233 |
| 6,549,944 B1 | 4/2003 | Weinberg et al. | 709/224 |
| 6,560,605 B2 | 5/2003 | Albers et al. | 707/10 |
| 6,606,654 B1 | 8/2003 | Borman et al. | 709/219 |
| 6,629,138 B1 | 9/2003 | Lambert et al. | 709/224 |
| 6,631,496 B1 | 10/2003 | Li et al. | 715/501.1 |
| 6,687,745 B1 | 2/2004 | Franco et al. | 709/219 |
| 6,721,780 B1 | 4/2004 | Kasriel et al. | 709/203 |
| 6,751,777 B2 | 6/2004 | Bates et al. | 715/501.1 |
| 6,771,290 B1 | 8/2004 | Hoyle | 715/745 |
| 6,854,009 B1 | 2/2005 | Hughes | 709/220 |
| 6,944,622 B1 | 9/2005 | Mitchell et al. | 707/102 |
| 6,950,847 B2 | 9/2005 | Harrisville-Wolff et al. | 709/201 |
| 6,963,914 B1 | 11/2005 | Breitbart et al. | 709/226 |
| 6,983,311 B1 | 1/2006 | Haitsuka et al. | 709/201 |
| 6,985,902 B2 | 1/2006 | Wise et al. | 707/10 |
| 6,993,554 B2 | 1/2006 | O'Donnell | 709/202 |
| 6,996,817 B2 | 2/2006 | Birum et al. | 717/170 |
| 7,000,195 B2 | 2/2006 | Komuro | 715/805 |
| 7,024,471 B2 | 4/2006 | George et al. | 709/222 |
| 7,032,183 B2 | 4/2006 | Durham | 715/823 |
| 7,036,738 B1 * | 5/2006 | Vanzini et al. | 235/486 |
| 7,051,351 B2 | 5/2006 | Goldman et al. | 725/34 |
| 7,054,881 B2 * | 5/2006 | Arcand et al. | 707/102 |
| 7,065,525 B1 * | 6/2006 | Sasaki et al. | 707/10 |
| 7,080,058 B1 * | 7/2006 | Upadhyayula et al. | 707/1 |
| 7,085,891 B2 * | 8/2006 | Trevathan | 711/133 |
| 7,089,082 B1 * | 8/2006 | Lukis et al. | 700/182 |
| 7,103,666 B2 | 9/2006 | Royer et al. | 709/227 |
| 7,127,526 B1 | 10/2006 | Duncan et al. | 709/249 |
| 7,284,007 B1 * | 10/2007 | Francicus de Heer et al. | 707/102 |
| 2002/0065848 A1 | 5/2002 | Walker et al. | 707/511 |
| 2002/0067805 A1 | 6/2002 | Andrews | 379/67.1 |
| 2002/0109718 A1 | 8/2002 | Mansour et al. | 345/744 |
| 2002/0111972 A1 | 8/2002 | Lynch et al. | 707/523 |
| 2002/0161826 A1 | 10/2002 | Arteaga et al. | 709/203 |
| 2002/0169743 A1 | 11/2002 | Arnold et al. | 707/1 |
| 2003/0004978 A1 | 1/2003 | Greenbaum | 707/202 |
| 2003/0069874 A1 | 4/2003 | Hertzog et al. | 707/1 |
| 2003/0101300 A1 | 5/2003 | Goldick | 710/200 |
| 2003/0115171 A1 | 6/2003 | Mangalvedhekar | 707/1 |
| 2003/0115172 A1 | 6/2003 | Mangalvedhekar | 707/1 |
| 2004/0015953 A1 | 1/2004 | Vincent | 717/173 |
| 2004/0032424 A1 | 2/2004 | Florscheutz | 345/748 |
| 2004/0199574 A1 | 10/2004 | Franco et al. | 709/201 |

OTHER PUBLICATIONS

Sew-Eurodrive GmbH & Co., "Systemwechsel bei Grohe: Solid Edge bildet die Basis," Online, XP-002261619, 4 pgs, Feb. 15, 2001.

Dr. Markus Sachers, "White Paper for PDM-Integration of OEM and Supplier in the Automotive Industry," Online, XP002261621, 55 pgs, Aug. 2001.

CIMdata, Inc., "Product Data Management: The Definition, An Introduction to Concepts, Benefits, and Terminology," Online, XP002226495, 27 pgs, Sep. 2, 1997.

PCT; Written Opinion; for International Application No. PCT 05-01-011; 6 pages, Mar. 31, 2005.

CIMdata, Inc., "Program Review of Eigner + Partner's axalant cPDm Program," Online, XP-002261620; pp. 1-31.

Sew-Eurodrive GmbH & Co., "Systemwechsel bei Grohe: Solid Edge bildet die Basis," Online XP-002261619, 4 pages.

Dr. Markus Sachers, "White Paper for PDM-Integration of OEM and Supplier in the Automotice Industry," Online, XP-002261621, 55 pages.

CIMdata, Inc., "Product Data Management: The Definition, An Introduction to Concepts, Benefits, and Terminology," Online XP-002226495, 27 pages.

Tom Chase; A Beginner's Guide to Pro/Engineer (version 2000i$^2$); pp. 1-32, Sep. 6, 2001.

"PDM Enablers: Joint Proposal to the OMG in Response to OMG Manufacturing Domain Task Force RFP 1;" mfg/Feb. 2, 1998; 265 pages.

"Pro/Collaborate: free collaborative CAD offering for Pro/Engineer customers" Design News, pp. 6-7, Oct. 15, 2001.

EPO Office Action; Reference # JL4489; Application No. 02 784 761.5—2201; 5 pgs, Mar. 6, 2007.

* cited by examiner

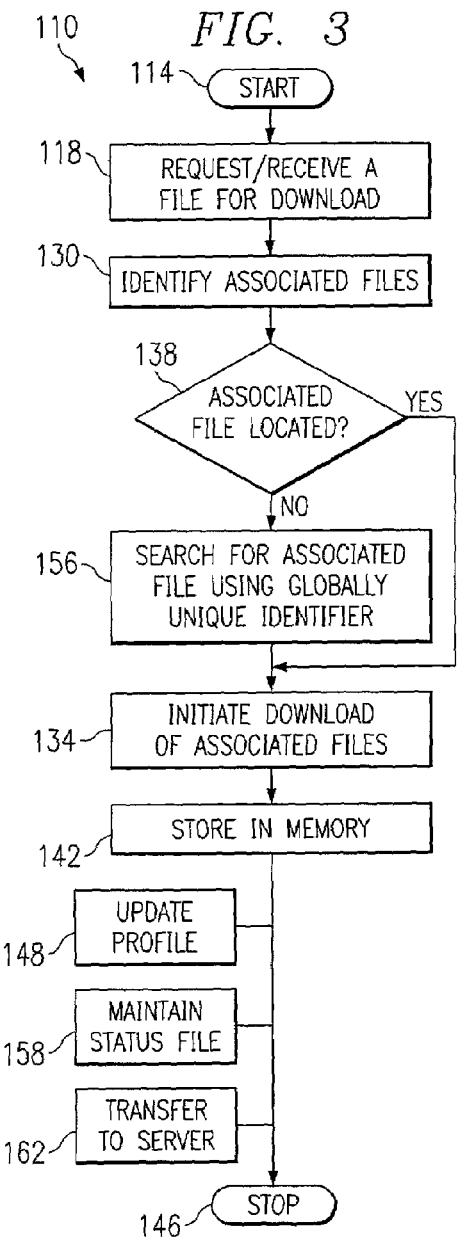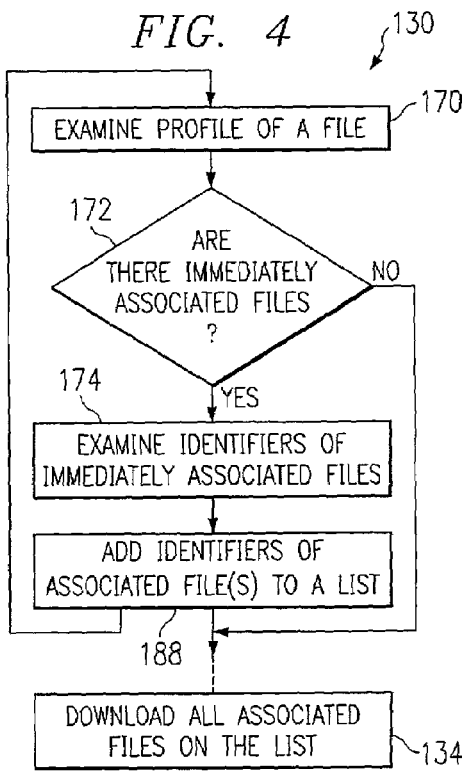

ELECTRONIC FILES PREPARATION FOR STORAGE IN A SERVER

RELATED APPLICATION

This application claims benefit under 35 U.S.C. §119 of U.S. provisional application Ser. No. 60/340,411 entitled "Electronic Files Preparation for Storage in a Server," which was filed on Dec. 13, 2001.

TECHNICAL FIELD OF THE INVENTION

This invention relates generally to electronic files and more particularly to electronic files preparation for storage in a server.

BACKGROUND OF THE INVENTION

Electronic data are frequently stored in and managed by a server that allows access by multiple clients. Accessing data in a server often involves transferring files having large amounts of data and complex file structures. Large assemblies may comprise several thousand individual part files having links to other files. As such, accessing an assembly file may require access to the several thousand individual part files. Opening these files directly from the server may be inefficient due to the high number of related files. This becomes more inefficient when clients are accessing the files over a network. Additionally, a client may move or rename linked files, making access of certain files by other clients difficult and, at times, impossible. A resulting problem is that the existing methods of preparing many related files for storage does not allow convenient access for clients.

SUMMARY OF THE INVENTION

According to one embodiment of the invention, a method for preparing files for storage in a server includes generating a profile for a selected file. The profile identifies at least one associated file as associated with the selected file. The method also includes transmitting, to a server, the selected file, the profile, and the at least one associated file.

According to another embodiment of the invention, a method for preparing a plurality of files for storage in a server includes providing a parent file having at least one level of descendent files. The method also includes generating a profile for the parent file. The profile identifies all of the descendent files that are immediately associated with the parent file as immediately associated with the parent file. The method also includes generating a profile for each descendent file in the level for each level of the descendent files. The profile identifies all of the descendent files that are immediately associated with the descendent file as immediately associated with the descendent file. The method also includes transmitting the parent file, each descendent file in each level of the descendent files, and the profiles to the server.

Some embodiments of the invention provide numerous technical advantages. Some embodiments may utilize some, none, or all of these advantages. For example, according to one embodiment, files are stored in a manner that allows clients to automatically download a file and all of its associated files. According to another embodiment, files are stored in a manner that allows a client to quickly ascertain the relationship of any one file with respect to another file. According to another embodiment, files are stored in a manner that allows a client to locate any moved or renamed files.

Other technical advantages may be readily ascertained by one of skill in the art.

BRIEF DESCRIPTION OF THE DRAWINGS

Reference is now made to the following description taken in conjunction with the accompanying drawings, wherein like reference numbers represent like parts, in which:

FIG. 3 is a flowchart illustrating an embodiment of a method of managing electronic files; and FIG. 4 is a flowchart illustrating further details of a step of identifying associated files in the method of FIG. 3.

DETAILED DESCRIPTION OF EXAMPLE EMBODIMENTS OF THE INVENTION

Example embodiments of the invention are best understood by referring to FIGS. 1A through 4 of the drawings, like numerals being used for like and corresponding parts of the various drawings.

Figure 1A:
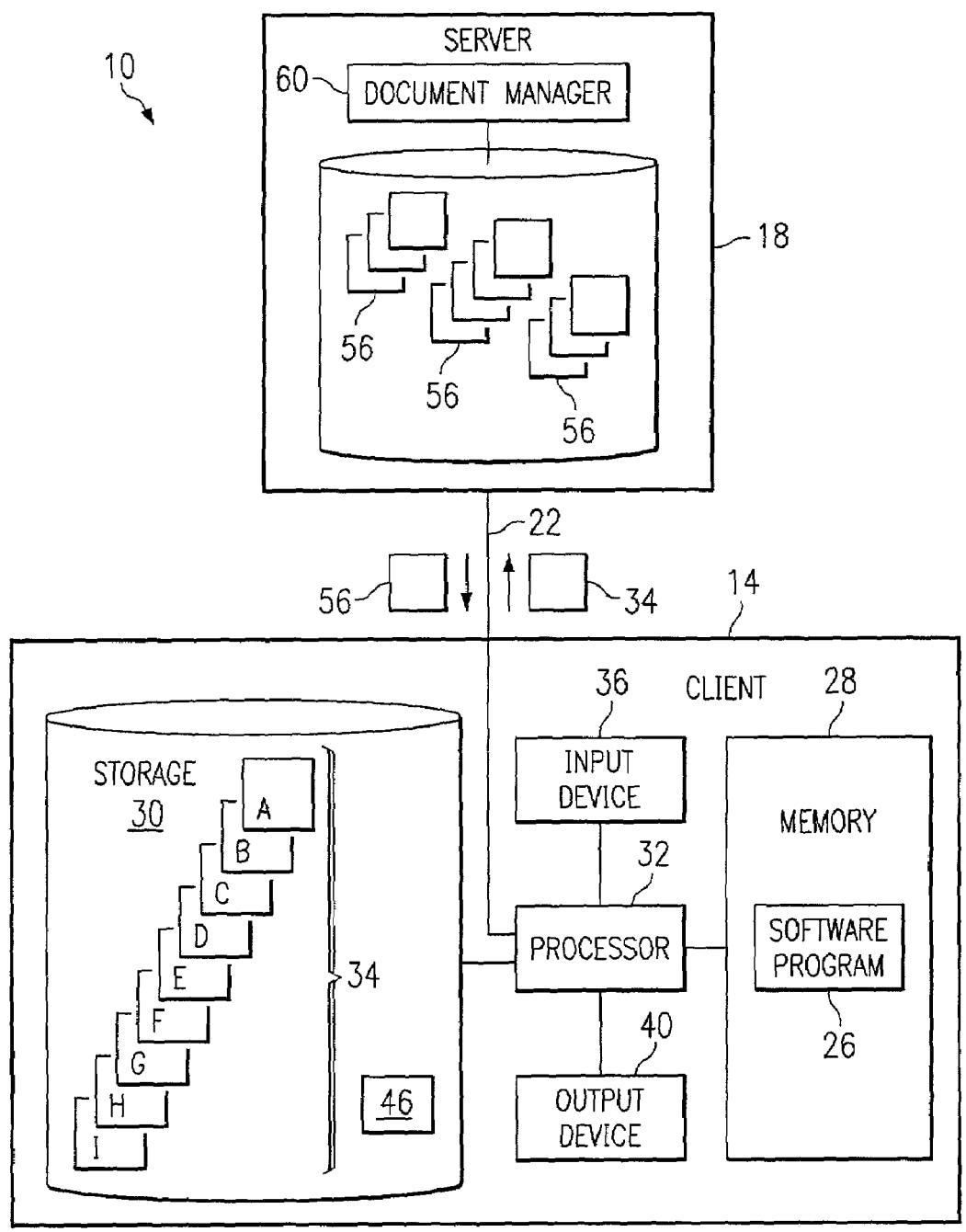
FIG. 1A is a block diagram illustrating an embodiment of a system for managing electronic files.

FIG. 1A is a block diagram of a system 10 according to the teachings of the present invention. System 10 includes a client 14 that is associated with a server 18 by a link 22. Client 14 may be any device that is capable of managing, generating, or storing data, or client 14 may perform other functions related to any data. One example of client 14 is a computer executing suitable client software. Server 18 may be any device that is capable of managing data and that allows at least one client 14 to access data stored in server 18. Link 22 may comprise a medium capable of transporting data between endpoints, such as client 14 and server 18. System 10 may include a plurality of clients 14; however, only one client 14 is shown for clarity of illustration.

Client 14 includes, in the illustrated embodiment, a processor 32, a memory 28, a storage medium 30, an input device 36, and an output device 40. Processor 32 may be any device operable to process data and execute instructions. An example of processor 32 is the Pentium processor available from Intel Corporation; however, other processors may be used. Processor 32 is coupled to link 22. Input device 36, output device 40, memory 28, and storage medium 30 are coupled to processor 32. Memory 28 may be Read Only Memory, Random Access Memory, or may be a removeable medium such as a floppy disk.

Software program 26 may be any instruction or set of instructions that, when executed by processor 32 of client 14, is operable to transmit, receive, generate, copy, or serve other functions that are related to data. Examples of software program 26 are word processing programs, computer-aided drafting programs such as Solid Edge™ available from Unigraphics Solutions, or other commercial or non-commercial programs. Software program 26 may be a part of an application program such as a drawing package. In the example shown in FIG. 1A, software program 26 resides in memory 28, but software program 26 may also reside in storage medium 30.

Storage medium 30 may be any media that is capable of storing data. An example of storage medium 30 is a conventional hard drive, Compact Disc Read Only memory, Compact Disc Rewritable memory, or other types of electronic data storage. Files 34 reside in storage medium 30 in this embodiment; however, files 34 may also be stored in memory 28. Files 34 may have been generated by client 14 and/or downloaded from server 18. Files 34 may be associated with each other in various ways. Example associations between files 34 are described in conjunction with FIG. 1B. Storage medium 30 may also store a list 46 describing associations between a given file 34 and its related files, as described in greater detail below. Although only one list 46 is shown, a separate list 46 may be stored in client 14 for each file 34. List 46 may be generated by software program 26. List 46 may alternatively be stored in memory 28.

Server 18 includes storage medium 52 that stores files 56. Files 56 represent versions of files 34 stored on client 14 that may be accessed by a plurality of clients 56. Files 34 are local versions of files 56 that may be modified and then stored as files 56 on server 18. In one embodiment, files 56 may be managed by a document manager 60. In one embodiment, document manager 60 manages files 56 by maintaining an appropriate file structure, indexing any metadata associated with any of files 56, and accounting for files 56 using identifiers, such as a Uniform Resource Locator ("URL"). Metadata refers to a description of data. In one embodiment, document manager 60 may be a web-based portal, such as Microsoft SharePoint™. However, other types of document managers may be used.

Figure 1B:
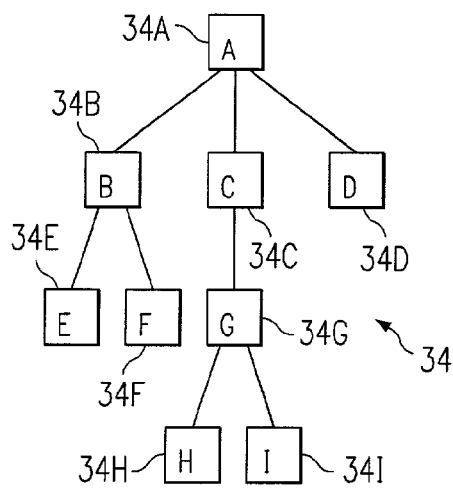
FIG. 1B is a schematic diagram illustrating an example file and its related files stored in the system of FIG. 1A.

FIG. 1B illustrates an example of the structure of files 34. The illustration of FIG. 1B may also illustrate an example of the structure of files 56 because files 56 are files 34 that were transferred from client 14. To avoid redundancy of explanation, FIG. 1D is described using only files 34.

In one embodiment, files 34 may be assemblies generated by software program 26, which may be a drawing package such as Solid Edge™. In this example, file 34A is designated as a "selected file." A "selected file" refers to one of files 34 that is designated for a data management action, such as being opened, uploaded and/or downloaded. In that sense, any one of files 34 may be a selected file at some point in time. For example, file 34A may be the selected file because file 34A is selected to be downloaded by client 14.

Selected file 34A may need to use or access one or more of the other files 34. These files that selected file 34A directly uses are referred to herein as "first generation" descendants. For example, the individual part files of a drawing file created by a drawing package such as Solid Edge™ may be categorized into multiple generations of files; the individual part files used directly by the drawing file are first generation descendants. The first generation descendants in this example are files 34B, 34C, and 34D. Each of the first generation descendants, in turn, may directly use additional files. Files used by a first generation descendant file are referred to herein as second generation files. The second generation files in this example are files 34E, 34F, and 34G. File 34B directly uses second generation files 34E and 34F. File 34C directly uses second generation file 34G. File 34D uses no second generation file. A third generation of descendants in this example is represented by files 34H and 34I, both of which are directly used only by file 34G. The generations of descendants may continue depending on the needs of the selected file.

Although files 34B through 34I are categorized into multiple generations, all of files 34B through 34I are referred to as associated files of file 34A because files 34B through 34I are descendants of file 34A. A descendant of a selected file is a file that will be used by the selected file or is used by another descendant of the selected file. Files 34B, 34C, and 34D are referred to as immediately associated files of file 34A because file 34A directly uses these files without going through an intermediate file. Once files 34B, 34C, and 34D are selected for access and/or downloading, each of files 34B, 34C, and 34D may be referred to as a selected file. As the selected files, files 34B, 34C, and 34D each may have immediately associated files among the second generation descendants. For example, file 34E and file 34F are immediately associated files of file 34B because from file 34B's point of view, file 34B must access file 34E and file 34F to properly support file 34A. File 34C has the associated files of files 34G, 34H, and 34I, but only file 34G is an immediately associated file because from file 34C's point of view, access to file 34G is necessary to properly support the function of file 34C. File 34D has no immediately associated file.

In a conventional data management system, client 14 executing software program 26 may interact with server 18 over link 22 to upload, store, and/or download one or more files 34. For example, client 14 may generate file 34A and associated files 34B through 34I. Client 14 generates an identifier for each of files 34, and uploads files 34, along with any relevant metadata associated with each of files 34 to server 18 and stores the files as files 56. Document manager 60 of server 18, in turn, manages files 56 and indexes the respective metadata. Because each of files 56 has a corresponding one of files 34, in this example, files 56 include the same file structure as files 34, illustrated in FIG. 1B. To avoid redundancy of explanation, files 56 are referred to in the below example by reference to their corresponding files 34. When client 14 wishes to download file 34A, client 14 sends a request for file 34A. Document manager 60 locates file 34A and transmits file 34A to client 14. Client 14 receives file 34A, but does not automatically obtain the file that file 34A uses, either directly or indirectly, namely files 34B through 34I. But these files are needed to use file 34A. Obtaining the multiple levels of descendant files associated with file 34A may be time consuming, cumbersome, and may require significant user interaction. Furthermore, locating certain ones of associated files 34B through 34I may be difficult if another user accessing those files renames or relocates any of them.

According to the teachings of the invention, an apparatus, a method, and a system are provided that improve the efficiency of using files 34. In one embodiment, efficiency may be improved by generating a profile for each of files 34 that facilitates downloading, all at once, any associated files necessary to use a particular one of files 34. This is advantageous because having all of the files associated with a particular file stored locally in client 14 allows client 14 to work more efficiently with files 34. Furthermore, renamed or relocated files 34 may be located using a profile associated with the renamed or relocated files. Additional details of example embodiments of the apparatus, the system, and the method are described in greater detail below in conjunction with FIGS. 1C through 4.

Figure 1C:
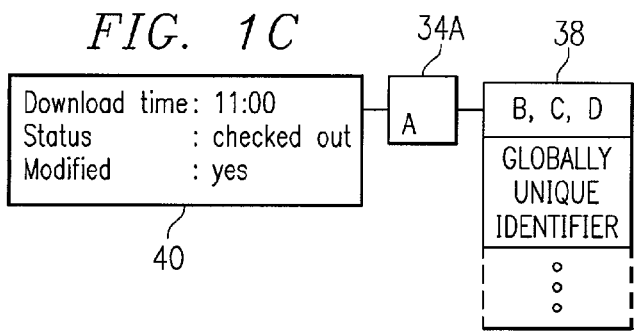
FIG. 1C is a schematic diagram illustrating an example profile associated with the example file illustrated in FIG. 1B.
Figure 1D:
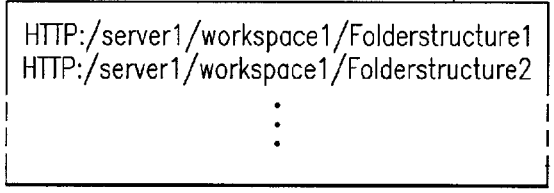
FIG. 1D is a schematic diagram illustrating additional details of the profile illustrated in FIG. 1C.

FIG. 1C illustrates one embodiment of a profile 38 and a status file 42. A separate profile 38 and status file 42 may be stored for each file 34, in one embodiment. Profile 38 and status file 42 are not explicitly shown in FIGS. 1A and 1B. In one embodiment, profile 38 for any given file 34 may identify files that are immediately associated with the file. For example, for file 34A, profile 38 lists files 34B through 34D as immediately associated files of file 34A. A profile for file 34B (not explicitly shown) may in turn list files 34E and 34F as being immediately associated with file 34B. In another embodiment, profile 38 may identify all of associated files 34B through 34I for file 34A. Files 34 may be identified by profile 38 by any type of identifier, including a URL (as shown in FIG. 1D) and a globally unique identifier. The globally unique identifier is a unique identifier that is associated with each of files 34 that does not change when the file is renamed or relocated in server 18. Document manager 60, such as Microsoft SharePoint™, may index globally unique identifiers for rapid searching. Other indexable information pertaining to each of files 34 may also be listed in profile 38. In one embodiment, there may be more than one profile 38 for each file 34. For example, one profile 38 of file 34A may identify files 34B through 34D by their respective Uniform Resource Locators, while another profile of file 34A may identify files 34B through 34D by their respective globally unique identifiers. Listing associated files, immediate or otherwise, in profile 38 facilitates identifying all files used by file 34A, which facilitates downloading those files for use by software program 26.

Status file 42 may contain information such as the time of download, check out and check in status, and status of modification of any given file. Each of files 34 may have a status file 42 assigned to it. Status file 42 is generated by software 26, but could be generated by other components, such as document manager 60. Status file 42 may be a cookie file. Having a status file 42 associated with each of files 34 is advantageous because the information pertaining to each of files 34 in status file 42 may be used to facilitate updating files 34 for transferring back to server 18.

In operation, system 10 allows management of files 34 and files 56 by generating and examining profile 38 associated with each of files 34 and 56. Software program 26 may generate file 34A and prepare it for transfer to server 18, making file 34A available to all clients 14. In generating file 34A, in one embodiment, software program 26 also creates files 34B through 34I, which are necessary to present or use the information in file 34A. For each of files 34, software program 26 generates at least one profile 38. Once a respective profile 38 for each file 34 is prepared, software program 26 transmits files 34 to document manager 60 of server 18. In turn, document manager 60 receives the transmission and stores files 34 and respective profiles 38 in storage medium 52 as files 56. Generating profiles 38 identifying the files needed to use any given file 34 is advantageous because those associated files may be downloaded all at once and stored locally on client 14. Client 14 may either identify all associated files at once or alternatively, recursively examine each of profiles 38 associated with each of the immediately associated files until all associated files (descendants) are identified and downloaded. Further details of examining profiles 38 are described below in conjunction with FIGS. 3 and 4. Once files 56 are stored in server 18 with respective profiles (profiles not explicitly shown in FIG. 1A), files 56 are ready to be downloaded by client 14, when needed again.

At a user's command, software program 26 on client 14 requests download of one of files 56. Software program 26 may send the request for download over link 22 to document manager 60 of server 18. Upon receiving the request, document manager 60 locates and transmits the file 56 and its associated profile 38 to client 14 to be stored in storage medium 30.

In one embodiment, software program 26 examines profile 38 of the downloaded file to identify immediately associated files (those files directly used by the downloaded file). Then software program 26 creates a list 46 that identifies the immediately associated files of the downloaded file. For example, for the example where downloaded file 56 corresponds to file 34A, list 46 may identify the files 56 corresponding to files 34B through 34D as immediately associated files. Software program 26 then sends a request to document manager 60 to examine the respective profiles 38 of the immediately associated files 56 corresponding files 34B through 34D. Upon examination, software program 26 identifies the immediately associated files of the files 56 corresponding to file 34B, file 34C and file 34D and stores their respective identifiers on list 46. Once the immediately associated files in one level of descendants are determined, software program 26 identifies the immediately associated files in the next level of descendants in list 46. This process continues until list 46 identifies all of the associated files or descendants of the downloaded file. Software program 26 then uses list 46 to request download of all associated files identified on list 46. Once all associated files of file 34 are downloaded, they are stored in storage medium 30.

In another embodiment, where profile 38 lists all associated files or descendants of file 34A, software program 26 identifies all associated files by examining profile 38 and requests download of all associated files from server 18. One of skill in the art may determine other procedures to determine identities of all associated files of a particular file using profile 38.

Figure 2:
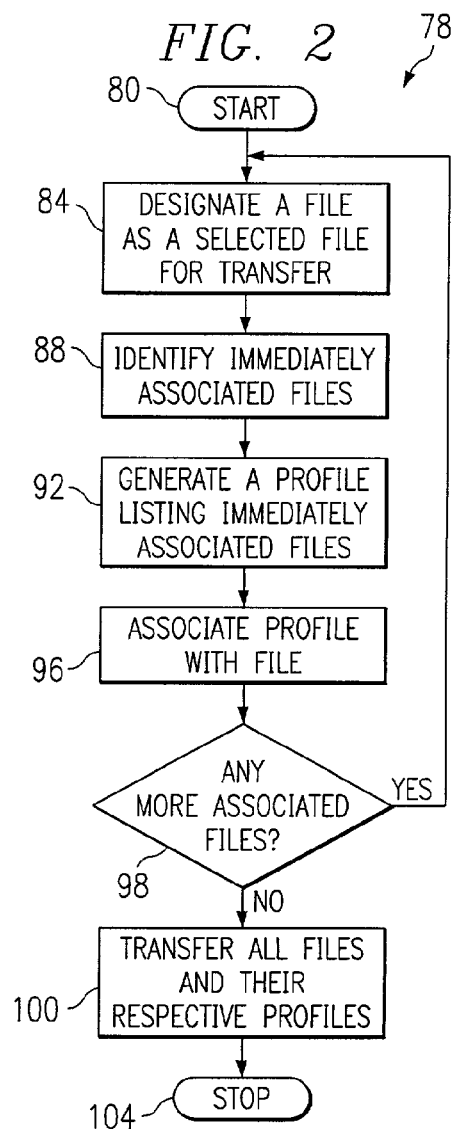
FIG. 2 is a flowchart illustrating an embodiment of a method of preparing files for storage in a server.

FIG. 2 is a flowchart illustrating an embodiment of a method 78 of preparing files for storage in server 18. In one embodiment, method 78 may be implemented by system 10 shown in FIG. 1. The file structure shown in FIG. 1B is used as a representative example to describe method 78. Method 78 starts at step 80. At step 84, file 34A is designated as a selected file for transfer to server 18. In one embodiment, file 34A may have been generated by software program 26. Once file 34A has been designated as the selected file, in one embodiment, profile 38 of file 34A identifies files that are immediately associated with file 34A at step 88. Examples of the immediately associated files of file 34A are files 34B through 34D (shown in FIG. 1B). At step 92, profile 38 for file 34A is generated; in one embodiment, profile 38 lists files immediately associated with file 34A. In one embodiment, other information such as a globally unique identifier for each of the immediately associated files may be listed in profile 38. In another embodiment, profile 38 may identify the immediately associated files using the Uniform Resource Locators.

At step 98, software program 26 determines whether any associated files of file 34A is without a profile 38. Steps 84 through 98 are repeated for each of the files 34B through 34I, so that each profile 38 of each associated file identifies that associated file's immediately associated files. For example, file 34B is designated as the selected file at step 84. Then files 34E and 34F are identified as the immediately associated files of file 34B at step 88. At step 92, profile 38 is generated that lists files 34E and 34F as immediately associated files. At step 98, software 26 determines that there are still other associated files requiring generation of a profile listing its descendants. Thus, steps 84 through 98 of method 78 are repeated again. File 34C is designated as the selected file at step 84. Then file 34G is identified as the only immediately associated file of file 34C at step 88. At step 92, a profile 38 is generated that lists file 34G as being the immediately associated file.

Upon going back to step 84 at step 98 and designating file 34D as the selected file, software 26 recognizes that file 34D has no immediately associated files. As such, in one embodiment, each of the next generation of files are designated as a selected file, and steps 84 through 98 of method 78 are repeated for the remaining associated files until all of the associated files are examined for any immediately associated files. If immediately associated files are found, then the immediately associated files are identified in a profile 38 and associated with the respective file. The end result, in this example, is that a profile 38 of file 34B identifies files 34E and 34F. A profile 38 for file 34C identifies file 34G. A profile 38 of file 34G identifies files 34H and 34I. Each of files 34D, 34H, and 34I has associated with it a profile 38 listing no immediately associated files.

Software 26 may identify all associated files of the selected file at step 88, and not just immediately associated files, and generate a profile 38 identifying all associated files, in one embodiment. In that embodiment, steps 84 through 96 are not repeated because all associated files of file 34A are listed in profile 38.

Then at step 100, file 34A and all of its associated files of file 34B through file 34I are transmitted to server 18 over link 22 for storage as files 56. Method 78 concludes at step 104. Method 78 is advantageous because it allows client 14 to rely on examining the profile 38 for any given file 56 to determine the associated files it uses when downloading that file. Determining the files required by any given file ahead of time allows client 14 to download, all at once, all of the associated files, increasing the efficiency of file access.

FIG. 3 is a flowchart illustrating a method 110 of accessing, by client 14, files 56 in server 18. In one embodiment, method 110 may be implemented by system 10 shown in FIG. 1. Files 56 are files 34 that were generated and prepared by client 14 using method 78 and transferred to server 18 for storage as files 56. Because each of files 56 has a corresponding one of files 34, in this example, files 56 include the same file structure as files 34 illustrated in FIG. 1B. To avoid redundancy of explanation, files 56 are now referred to as files 34 to describe method 110. In addition, individual files of files 56 are now referred to as files 34A through 34I.

Method 110 starts at step 114. At step 118, software program 26 transmits a request to server 18 for downloading one of files 34, such as file 34A, and receives file 34A with an associated profile 38. Then software program 26 identifies files that are associated with file 34A at step 130. In an embodiment in which profile 38 identifies all associated files (files 34B through 34I, in this example), software program 26 initiates download of all associated files at step 134. In one embodiment in which profile 38 identifies only the immediately associated files (files 34B through 34D, in this example), the respective profiles of the immediately associated files, their immediately associated files (in this example, files 34E, 34F, and 34G), and so on, are recursively examined until all associated files of file 34A are identified. Then at step 134, downloading of all associated files is initiated. Further details of that embodiment are discussed in conjunction with FIG. 4.

At step 138, if one or more of the associated files cannot be found in server 18, then software program 26 initiates a search for the missing files using their respective globally unique identifiers at step 156. Once all associated files are downloaded, in one embodiment, the associated files and the selected file are stored in a local memory under local identifiers at step 142. For example, files 34 may have been stored in server 18 under the following URL format:
HTTP:\server name\work space\folder structure The URL format above can be modified as the following local identifier:
C:\root directory\server name\work space\folder structure Storing files 34 in a local memory under local identifiers as shown in the example above allows the user to access files 34 as local files, which improves efficiency of file access.

In one embodiment, software program 26 generates status file 42 at step 158 for each of files 34 and maintains status file 42 in storage medium 30 by updating, information stored in status file 42, such as check out/check in status and time stamp. Once a user finishes using file 34A and all of its associated files 34B through 34I, software program 26 transmits all of files 34 back to server 18 at step 162, along with all the updated information of status file 42. Method 110 concludes at step 146.

This method is advantageous, at least in some embodiments, because client 14 may access file 34A and all of its associated files (file 34B through file 34I) as local files by downloading files 34 at approximately the same time into storage medium 30. Method 110 eliminates the need for software program 26 to access server 18 over link 22 multiple times to download the associated files because all of the associated files are identified first, and subsequently downloaded from server 18 in this embodiment. Method 110 is also advantageous because if one of files 34 has been relocated or renamed, then the globally unique identifiers may be used to find the missing files and update the respective profile 38 and status file 42 to reflect the new location of the missing files. Storing files 34 in storage medium 30 under local identifiers allows software 26 to access files 34 to the user as local files, which improves efficiency of file access.

FIG. 4 is a flowchart illustrating further details of one embodiment of step 130 of identifying the associated files shown in FIG. 3. In this embodiment, profile 38 associated with file 34A identifies only the immediately associated files of file 34A (files 34B through 34D in this example). Software program 26 examines profile 38 of the selected file, such as file 34A, at step 170. At step 172, software program 26 determines whether profile 38 lists any immediately associated files, such as files 34B through 34D. If there is one or more immediately associated files, then the identifiers of the immediately associated files are determined at step 174 from profile 38. At step 188, software program 26 adds the identifiers of the immediately associated files to list 46. Then software program 26 repeats steps 170 through 188 for each of the immediately associated files of file 34A until no more immediately associated files can be found. For example, at step 170, software program 26 examines a profile 38 of file 34B. After determining that files 34E and 34F are immediately associated files of 34B at step 172, software program 26 determines the identifiers of files 34E and 34F (which, in this example, are E and F) at step 174. Software 26 then adds the identifiers to list 46. Steps 170 through 188 are repeated again in this manner for file 34C, where a profile 38 for file 34C identifies file 34G as an immediately associated file, determines file 34G's identifier (G, in this example), and adds "G" to list 46. Once list 46 identifies the immediately associated files of all associated files of file 34A, the associated files on list 46 are downloaded at step 134.

Methods and systems described in detail above offer a solution to difficulties related to managing electronic files. One benefit from some embodiments provides quick access to a relevant file and all of the associated files necessary to use the relevant file because all of the necessary files are accessible as local files. Another benefit from some embodiments provides a way to find and download a selected file and all of its associated files even if one or more of them are either renamed or relocated. This may be performed by searching for the missing files using globally unique identifiers.

Although the present invention has been described in detail it should be understood that various changes, substitutions and alterations can be made hereto without departing from the spirit and scope of the invention as defined in the appended claims.

What is claimed is:

1. A method for preparing files for storage in a server comprising:
   generating a profile for a selected file, the profile identifying at least one associated file to be accessed by the selected file;
   transmitting, to a server, the selected file, the profile, and the at least one associated file;
   associating a globally unique identifier with each of the files, wherein the profile additionally identifies the at least one associated file by the respective globally unique identifiers;
   after transmitting the selected file, the profile, and the at least one associated file, determining if any of the at least one associated file is a missing file, wherein the missing file is any of the at least one associated file that has a different identifier than the identifier used by the profile to identify the at least one associated file; and
   searching, using a globally unique identifier associated with each of the at least one associated file, for the missing file and storing a result of the searching on a computer readable storage medium.

2. The method of claim 1, and further comprising:
   after transmitting the selected file, the profile, and the at least one associated file, initiating downloading of the selected file from the server;
   identifying the at least one associated file by examining the profile; and
   in response to identifying the at least one associated file by examining the profile, initiating downloading of the at least one associated file from the server.

3. The method of claim 2, and further comprising, in response to initiating downloading of the at least one associated file from the server, storing the at least one associated file in a memory associated with a client under a local identifier.

4. The method of claim 1, wherein the profile identifies the at least one associated file using a Uniform Resource Locator.

5. The method of claim 1, and further comprising:
   determining the different identifier of the missing file; and
   updating the profile with the different identifier for the missing file.

6. The method of claim 1, and further comprising:
   receiving, at the server, the selected file, the profile, and the at least one associated file; and
   indexing, at the server by a document manager residing in the server, the profile.

7. A method for file management, comprising:
   generating, at a client device, a profile for a selected file that is to be downloaded from a server, the profile identifying all associated files to be accessed by the selected file after the selected file is downloaded from the server;
   transmitting, to a server, the selected file, the profile, and all of the associated files;
   after transmitting the selected file, the profile, and all of the associated files, initiating downloading of the selected file from the server;
   identifying all of the associated files by examining the profile;
   in response to identifying all of the associated files, initiating downloading of all of the associated files from the server;
   associating a globally unique identifier with each of the files, wherein the profile additionally identifies at least one of the associated files by the respective globally unique identifiers;
   after transmitting the selected file, the profile, and all of the associated files, determining if any of the associated files is a missing file, wherein the missing file is any of the associated files that has a different identifier than the identifier used by the profile to identify the associated file; and
   searching for the missing file using the globally unique identifier of the missing file and storing a result of the searching on a computer readable storage medium.

8. The method of claim 7, wherein the profile identifies the at least one associated file using a Uniform Resource Locator.

9. The method of claim 7, and further comprising:
   determining the different identifier of the missing file; and
   updating the profile with the different identifier for the missing file.

10. The method of claim 7, and further comprising:
    receiving, at the server, the selected file, the profile, and the at least one associated file; and
    indexing, at the server by a document manager residing in the server, the profile.

11. The method of claim 7, and further comprising, in response to initiating downloading all of the associated files from the server, storing the associated files in a memory associated with a client using a plurality of local identifiers.

12. A method for preparing a plurality of files for storage in a server comprising:
    providing a parent file having at least one level of descendent files;
    generating a profile for the parent file identifying all of the descendent files that are immediately associated with the parent file as immediately associated with the parent file;
    for each level of the descendent files, generating a profile for each descendent file in the level, the profile identifying all of the descendent files that are immediately associated with the descendent file as immediately associated with the descendent file;
    transmitting the parent file, each descendent file in each level of the descendent files, and the profiles to the server;
    after transmitting the parent file, each descendent file in each level of the descendent files, and the profiles, initiating downloading of the parent file from the server;
    identifying the descendent files in each level of the descendent files by examining the profiles;
    in response to identifying the at least one associated file, initiating downloading of all of the descendent files in each level of the descendent files from the server;
    after transmitting the parent file, the each descendent file in each level of the descendent files, and the profiles to the server, determining if any of the each descendent file is a missing file, wherein the missing file is any of the each descendent file that has a different identifier than the identifier used by the profile to identify the each descendent file; and
    searching, using a globally unique identifier associated with the each descendent file, for the missing file and storing a result of the searching on a computer readable storage medium.

13. The method of claim 12, and further comprising compiling a list of all descendent files, and initiating downloading of all of the descendent files identified on the list.

14. The method of claim 12, wherein the profile identifies the each of the descendent files in each level of the descendent files using a Uniform Resource Locator.

15. The method of claim 12, and further comprising associating a globally unique identifier with each of the plurality of files, wherein the profile additionally identifies each descendent file by the respective globally unique identifiers.

16. The method of claim 12, and further composing:
determining the different identifier of the missing file; and
updating the profile with the different identifier for the missing file.

17. The method of claim 12, and further comprising:
receiving, at the server, the parent file, the profiles, and the descendent file; and
indexing, at the server by a document manager residing in the server, the profile.

18. The method of claim 12, and further comprising,
in response to initiating downloading of all of the descendent files in each level of the descendent files from the server, storing the all of the descendent files in each level of the descendent files in a memory associated with a client under a local identifier.

19. An apparatus for preparing files for storage in a server comprising:
a processor;
one or more computer readable storage media; and
software stored on at least one of the one or more computer readable storage media and operable to:
generate a profile for a selected file, the profile identifying at least one associated file to be accessed by the selected file;
initiate transmission, to a server, of the selected file, the profile, and the at least one associated file;
after transmitting the selected file, the profile, and the at least one associated file, determine if any of the at least one associated file is a missing file, wherein the missing file is any of the at least one associated file that has a different identifier than the identifier used by the profile to identify the at least one associated file; and
search, using a globally unique identifier associated with each of the at least one associated file, for the missing file and store a result of the search on at least one of the one or more computer readable storage media.

20. The apparatus of claim 19, wherein the software is further operable to:
initiate downloading of the selected file from the server;
identify the at least one associated file by examining the profile; and
in response to identifying the at least one associated file, initiate downloading of the at least one associated file from the server.

21. The apparatus of claim 20, wherein the software is further operable to, in response to initiating downloading of the at least one associated file from the server, store the at least one associated file in a memory associated with a client under a local identifier.

22. The apparatus of claim 19, wherein the software comprises a drawing package.

23. The apparatus of claim 19, wherein the profile identifies the at least one associated file using a Uniform Resource Locator.

24. The apparatus of claim 19, wherein the software is further operable to associate a globally unique identifier with each of the files, wherein the profile additionally identifies the at least one associated file by the respective globally unique identifiers.

25. The apparatus of claim 19, wherein the software is further operable to:
determine the different identifier of the missing file; and
update the profile with the different identifier for the missing file.

* * * * *